(12) United States Patent
Takayama

(10) Patent No.: US 10,177,693 B2
(45) Date of Patent: Jan. 8, 2019

(54) MOTOR DRIVE DEVICE

(71) Applicant: ROHM CO., LTD., Kyoto-shi, Kyoto (JP)

(72) Inventor: Yohei Takayama, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/427,531

(22) Filed: Feb. 8, 2017

(65) Prior Publication Data

US 2017/0229982 A1 Aug. 10, 2017

(30) Foreign Application Priority Data

Feb. 8, 2016 (JP) .................. 2016-021716

(51) Int. Cl.
| | |
|---|---|
| *H02P 6/12* | (2006.01) |
| *H02P 6/16* | (2016.01) |
| *H02P 29/024* | (2016.01) |
| *H02K 29/08* | (2006.01) |

(52) U.S. Cl.
CPC ............. *H02P 6/12* (2013.01); *H02K 29/08* (2013.01); *H02P 6/16* (2013.01); *H02P 29/024* (2013.01); *H02K 2213/06* (2013.01)

(58) Field of Classification Search
CPC ...................................................... H02P 6/12
USPC ................................ 318/400.21, 400.01, 700
See application file for complete search history.

(56) References Cited

U.S. PATENT DOCUMENTS

| | | | |
|---|---|---|---|
| 4,641,066 A | 2/1987 | Nagata et al. | |
| 8,405,339 B2 * | 3/2013 | Zhang .................. | G01R 31/343 |
| | | | 318/490 |
| 9,121,729 B2 * | 9/2015 | Ueda ...................... | G01D 5/244 |
| 9,523,573 B2 * | 12/2016 | Takaki .................. | G01D 5/244 |
| 2007/0247092 A1 | 10/2007 | Komatsu et al. | |
| 2016/0079906 A1 | 3/2016 | Arabackyj et al. | |

FOREIGN PATENT DOCUMENTS

| | | |
|---|---|---|
| JP | H07181601 A | 7/1995 |
| JP | 2000175481 A | 6/2000 |
| JP | 20030231875 A1 | 12/2003 |
| JP | 2010252608 A | 11/2010 |
| WO | 0182465 A1 | 11/2001 |
| WO | 2008135520 A2 | 11/2008 |
| WO | 2014173792 A2 | 10/2014 |

OTHER PUBLICATIONS

Extended European Search Report corresponding to Application No. 17154752.4-1906/3217532; dated Oct. 25, 2017.

* cited by examiner

*Primary Examiner* — David S Luo

(74) *Attorney, Agent, or Firm* — Cantor Colburn LLP

(57) ABSTRACT

A motor drive device determines whether or not a combination of logic levels of sensor signals S1 to S3 is normal, whenever the logic levels of the sensor signals S1 to S3 are changed. Each of the sensor signals S1 to S3 indicates a rotation position of a rotor. When the combination is not normal, the number of the level changes in each of the sensor signals S1 to S3 is counted. When the count value of any one of the sensor signals reaches a threshold value Cth, supply of power to a motor is stopped.

3 Claims, 8 Drawing Sheets

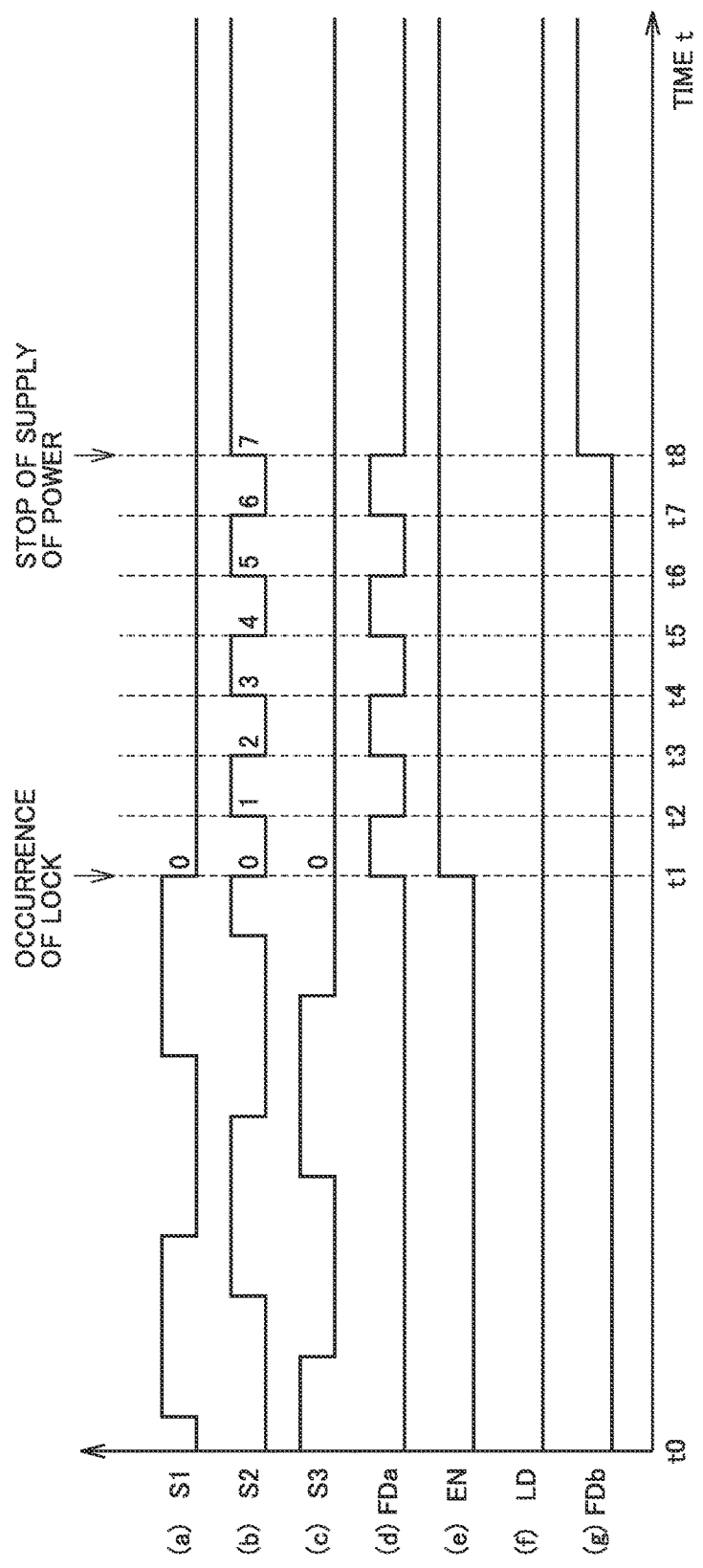

MOTOR DRIVE DEVICE

CROSS REFERENCE TO RELATED APPLICATIONS

The present invention claims priority under 35 U.S.C. § 119 to Japanese Application No. 2016-021716 filed Feb. 8, 2016, the entire content of which is incorporated herein by reference.

BACKGROUND OF THE INVENTION

Field of the Invention

The present invention relates to a motor drive device, particularly, a motor drive device configured to drive a three-phase brushless motor.

Description of the Background Art

A three-phase brushless motor includes: a stator including a plurality of armature coils; a rotor including a plurality of main magnets and rotatably supported; and a position detector configured to output first to third sensor signals each indicating a rotation position of the rotor. The phases of the first to third sensor signals are shifted from one another by 120°. By turning on/off each of a plurality of switching elements in synchronization with the first to third sensor signals to supply drive current to the plurality of armature coils, the rotor can be driven to rotate.

When the rotation of the rotor is locked due to, for example, failure of a load in such a three-phase brushless motor, overcurrent may flow in a switching element to damage the switching element. To address this, Japanese Patent Laying-Open No. 2000-175481 discloses a technique of determining, based on the rotational speed of the rotor, whether or not the rotation of the rotor is locked, and turning off all the switching elements when the rotation of the rotor is locked.

SUMMARY OF THE INVENTION

In the three-phase brushless motor, when the position detector is failed, the first to third sensor signals may become abnormal. In the technique of Patent Document 1, when the first to third sensor signals become abnormal to result in stop of the rotation of the rotor, it is determined that the rotation of the rotor is locked, with the result that all the switching elements are turned off.

However, when only one of the first to third sensor signals becomes abnormal, the three-phase brushless motor is operated with the two phases, with the result that the rotation of the rotor is continued. Hence, it is not determined that the rotation of the rotor is locked. Accordingly, overcurrent may flow in a switching element to damage the switching element.

In view of this, a main object of the present invention is to provide a motor drive device that is capable of preventing a drive circuit from being damaged when only one of the first to third sensor signals becomes abnormal.

A motor drive device according to the present invention is a motor drive device for driving a three-phase brushless motor. The three-phase brushless motor includes: a stator including a plurality of armature coils; a rotor including a plurality of permanent magnets and rotatably supported; and first to third magnetic sensors arranged in a rotation direction of the rotor, the first to third magnetic sensors being configured to respectively output first to third sensor signals. Each of the first to third sensor signals is alternately changed between first and second logic levels in accordance with rotation of the rotor, and the first to third sensor signals have phases shifted from one another by 120°. The motor drive device includes: a determination unit configured to determine whether or not a combination of the logic levels of the first to third sensor signals is normal, whenever the logic levels of the first to third sensor signals are changed; first to third counters configured to respectively count the number of level changes of the first to third sensor signals in response to determining, by the determination unit, that the combination of the logic levels of the first to third sensor signals is not normal; a signal generation unit configured to output a first abnormality detection signal when any one of count values of the first to third counters reaches a predetermined threshold value; and a drive circuit configured to (i) supply drive current to the plurality of armature coils in synchronization with the first to third sensor signals to generate a rotating magnetic field to rotate the rotor, and (ii) stop supplying the drive current in response to the first abnormality detection signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

Each of FIG. 1A to FIG. 1D illustrates configuration and operation of a three-phase brushless motor.

FIG. 10 is a time chart showing a yet another operation of the motor drive device shown in FIG. 2 to FIG. 6.

DESCRIPTION OF THE PREFERRED EMBODIMENTS

Each of FIG. 1A to FIG. 1D illustrates configuration and operation of a three-phase brushless motor 10. This three-phase brushless motor 10 is an outer rotor type brushless DC motor with a three-phase two-pole winding, and is used for driving of a fan for sending air, for example.

Figure 1A:
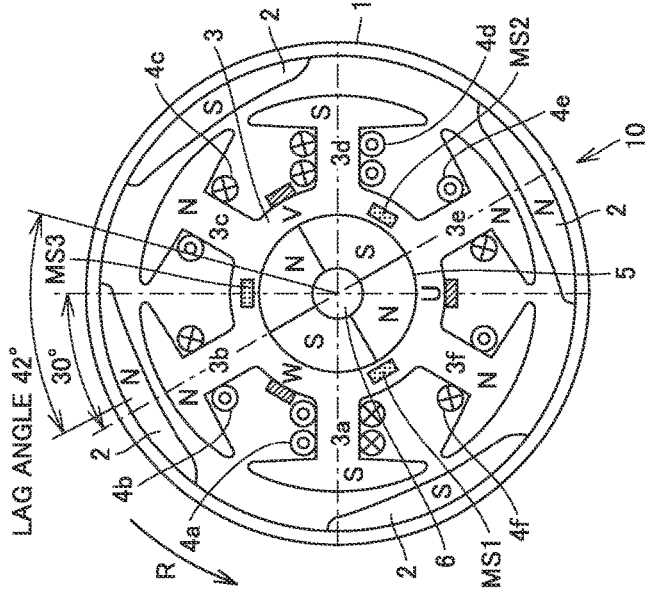

In FIG. 1A, this three-phase brushless motor 10 includes a cylindrical rotor 1 and a stator 3 provided inwardly of rotor 1. On the inner circumferential surface of rotor 1, four main magnets (magnetic field permanent magnets) 2 are disposed at an equal angular interval (interval of 90°). One pair of main magnets 2 facing each other are disposed such that their N poles face stator 3, whereas the other pair of main magnets facing each other are disposed such that their S poles face stator 3.

Six projection portions (cores) 3a to 3f are provided at the outer circumference of stator 3, and six armature coils 4a to 4f are respectively wound around the outer circumference portions of six projection portions 3a to 3f. When three-phase alternating current is supplied to three armature coils 4a to 4c and three-phase alternating current is supplied to the other three armature coils 4d to 4f, a rotating magnetic field is generated around stator 3 to rotate rotor 1.

Along the rotation axis of rotor 1, a shaft 6, which rotates together with rotor 1, is provided. A sensor magnet 5 for monitoring a rotation position of rotor 1 is attached to shaft 6. Rotor 1 is supported by a bearing (not shown) to be rotatable via shaft 6. Rotor 1, shaft 6, sensor magnet 5, and stator 3 are provided to be coaxial. Sensor magnet 5 has two pairs of N poles and S poles, which are arranged at an equal angle relative to the center of the rotation of rotor 1. Rotor 1, four main magnets 2, sensor magnet 5, and shaft 6 are rotated together in a rotation direction R.

Further, three magnetic sensors MS1 to MS3 are arranged at an equal angular interval (interval of 120°) in the rotation direction of rotor 1 so as to face the outer circumferential surface of sensor magnet 5. Three magnetic sensors MS1 to MS3 respectively output sensor signals S1 to S3. Each of magnetic sensors MS1 to MS3 detects a direction of a magnetic field generated by sensor magnet 5. For each of magnetic sensors MS1 to MS3, a Hall IC is used, for example. The Hall IC is a sensor configured to detect a magnetic field using a so-called Hall effect, in which when a magnetic field is perpendicularly applied to current, electromotive force is generated in a direction orthogonal to both the current and the magnetic field.

It should be noted that a comparator configured to shape the output signal of the Hall IC into a rectangular wave signal may be provided inside or outside magnetic sensor MS, or may be provided outside motor 10. Moreover, sensor magnet 5 may not be provided, and magnetic sensors M1 to M3 may detect the direction of the magnetic field generated by four main magnets 2.

Each of sensor signals S1 to S3 is set at an "H" level (first logic level) when a corresponding magnetic sensor MS faces the N pole of sensor magnet 5, and is set at an "L" level (second logic level) when corresponding magnetic sensor MS faces the S pole of sensor magnet 5. Each of sensor signals S1 to S3 is alternately changed between the "H" level and the "L" level in accordance with the rotation of rotor 1. The phases of sensor signals S1 to S3 are shifted from one another by 120°. When rotor 1 is rotated at a certain rotational speed, each of sensor signals S1 to S3 becomes a rectangular wave signal having a certain frequency. A combination of the logic levels of sensor signals S1 to S3 is changed by every 60°.

In three-phase brushless motor 10, generated torque is changed at a timing at which current to be supplied to armature coils 4a to 4f is switched, i.e., is changed depending on a positional relation between rotor 1 and main magnet 2. In the present embodiment, sensor magnet 5 is attached to shaft 6 at a lag angle of 42° relative to main magnet 2. Further, electric angular advance control is also performed.

In FIG. 1A, each of regions P1 represents an armature coil having a short current path and involving flow of current twice as large as current in the other armature coils. Each of regions P2 represents a position at which positive rotation torque is generated due to repulsive force between armature coil 4c (4f) and main magnet 2. Each of regions P3 represents a position at which counter torque is generated due to repulsive force between armature coil 4a (4d) and main magnet 2.

When brushless motor 10 is in the state of FIG. 1A, current flows from below-described MOS transistors (switching elements) Q1 to Q6 to armature coils 4a to 4f along paths shown in FIG. 1B.

That is, MOS transistors Q1, Q5 are turned on in synchronization with the signal output from magnetic sensor MS3, thereby applying predetermined DC voltage between a connection point Ua and a connection point Va from an external DC power supply. On this occasion, current flows from connection point Ua to connection point Va along two current paths. A first current path is a path from connection point Ua to connection point Va via armature coils 4c, 4f. A second current path is a path from connection point Ua to connection point Va via armature coils 4b, 4e and 4a, 4d.

Figure 1B:
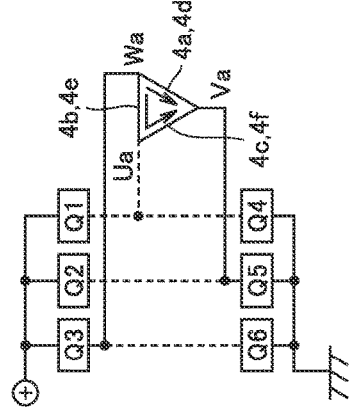

In the connection state of FIG. 1B, the resistance value of the first current path is half of the resistance value of the second current path, so that current twice as large as that in the second current path flows in the first current path. Regions P1 of FIG. 1A represent armature coils 4c, 4f in which such current twice as large flows. Between main magnet 2 and each of armature coils 4c, 4f of the first current path, particularly stronger repulsive force is generated as compared with each of armature coils 4a, 4b, 4d, 4e of the second current path. This repulsive force cancels the above-described counter torque, whereby rotor 1 is rotated in rotation direction R.

Figure 1C:
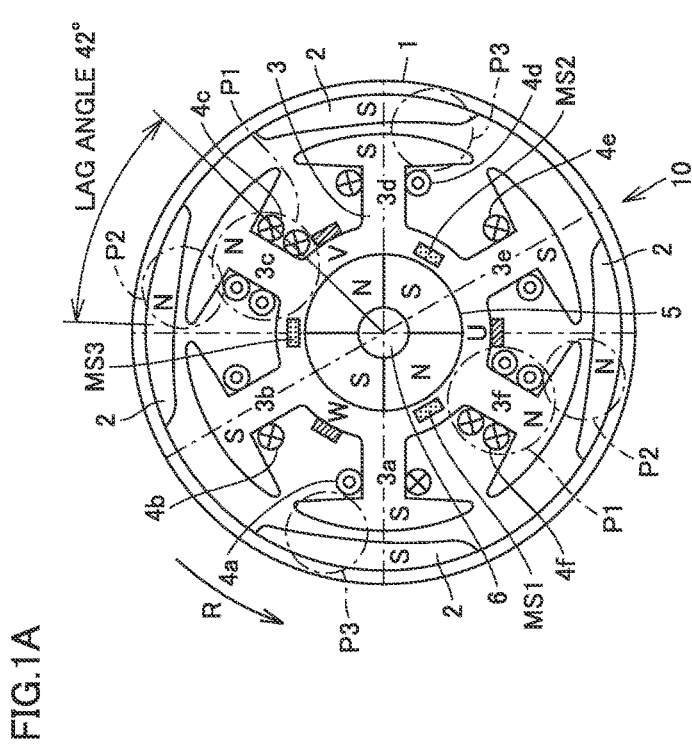
Figure 1D:
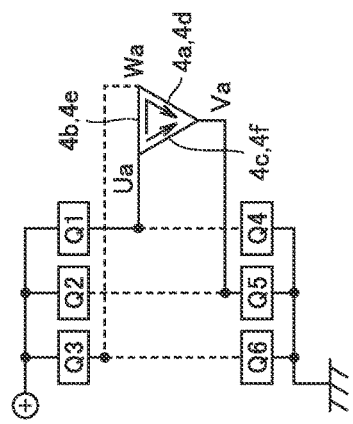

FIG. 1C shows a state in which rotor 1 is rotated by 30° in rotation direction R as compared with the state of FIG. 1A. FIG. 1D shows states of MOS transistors Q1 to Q6 on this occasion. In this case, MOS transistors Q3, Q5 are turned on in synchronization with the signal output from magnetic sensor MS1 to apply predetermined DC voltage between connection point Wa and connection point Va.

In the case of FIG. 1C, particularly stronger repulsive force is generated between main magnet 2 and each of armature coils 4a, 4d as compared with each of the other armature coils 4b, 4c, 4e, 4f, whereby rotor 1 is further rotated in rotation direction R. Thereafter, the same operation is repeated to continue the rotation of rotor 1 in rotation direction R.

It should be noted that since the N and S poles of sensor magnet 5 are disposed by every 90° in this three-phase brushless motor 10, the output signals of magnetic sensors MS1 to MS3 are changed in two cycles during one rotation of rotor 1. Accordingly, timing control of the rotation of rotor 1 can be performed finely twice.

Moreover, since three magnetic sensors MS1 to MS3 are provided, timing control of the rotation of rotor 1 can be performed finely three times as compared with a case where only one magnetic sensor is provided. Based on the output signals of three magnetic sensors MS1 to MS3, MOS transistors Q1 to Q6 are turned on/off 12 times in total during one rotation of rotor 1. In accordance with a combination of the MOS transistors having been turned on, power-supply side connection points for applying voltage to armature coils 4a to 4f and ground-side connection points are switched sequentially, thereby switching the direction of the current flowing in each of armature coils 4a to 4f. As a result, a rotating magnetic field is generated to obtain drive force for rotating rotor 1 in rotation direction R.

Figure 2:
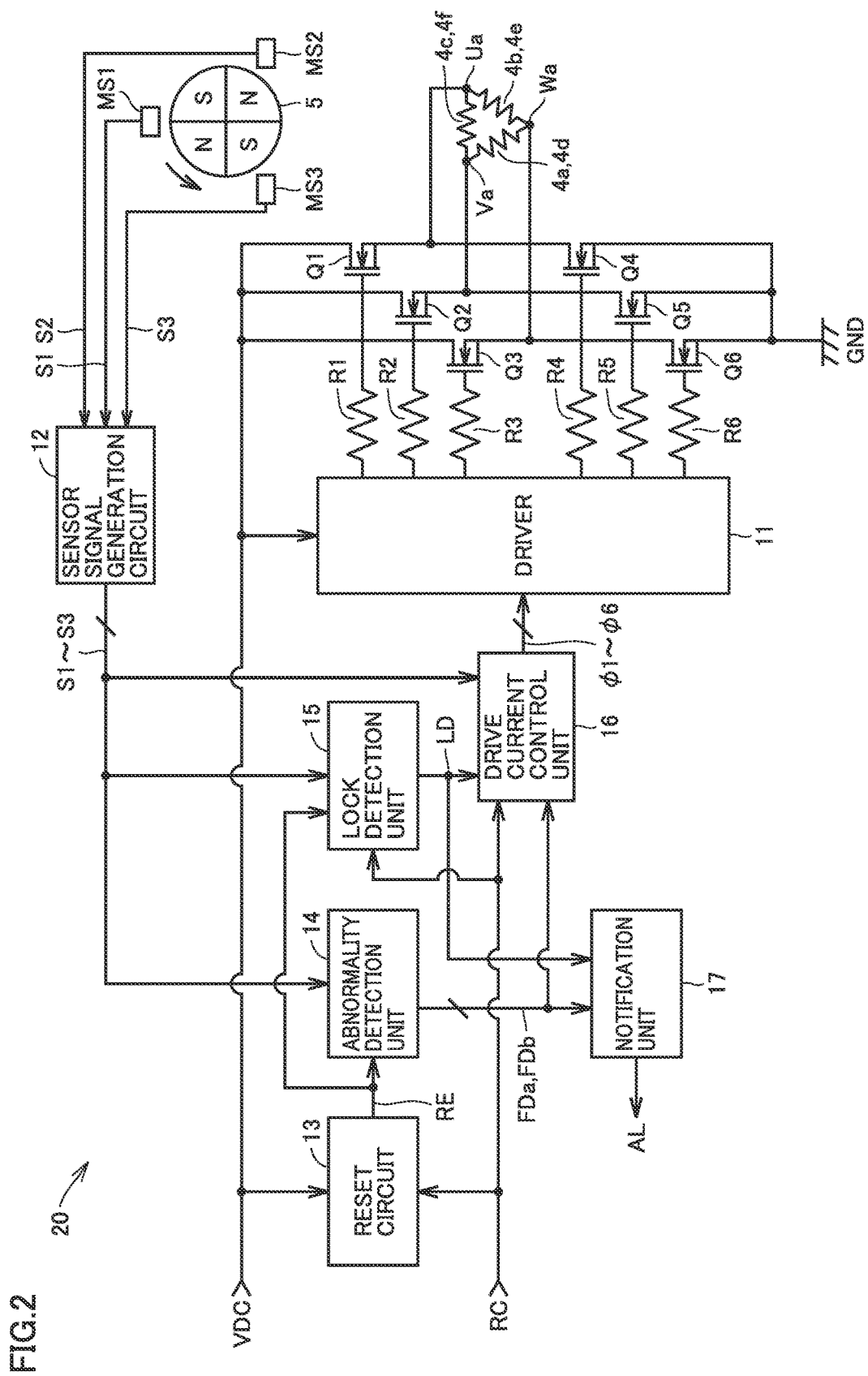
FIG. 2 is a circuit block diagram showing a configuration of a motor drive device according to one embodiment of the present invention.

FIG. 2 is a circuit block diagram showing a configuration of a motor drive device 20 configured to drive three-phase brushless motor 10 shown in FIG. 1. In FIG. 2, motor drive device 20 includes MOS transistors Q1 to Q6, resistive elements (gate resistors) R1 to R6, and a driver 11.

MOS transistors Q1 to Q3 have drains that receive DC voltage VDC supplied from an external DC power supply (not shown), and have respective sources connected to connection points Ua, Va, Wa. MOS transistors Q4 to Q6 have respective drains connected to connection points Ua, Va, Wa, and have sources that receive ground voltage GND. MOS transistors Q1 to Q6 have respective gates connected to driver 11 via resistive elements R1 to R6.

Driver 11 is driven in accordance with DC voltage VDC, and provides PWM signals $\phi 1$ to $\phi 6$ to the gates of MOS transistors Q1 to Q6 via resistive elements R1 to R6 to turn on/off MOS transistors Q1 to Q6 at predetermined timings.

This motor drive device 20 further includes a sensor signal generation circuit 12, a reset circuit 13, an abnormality detection unit 14, a lock detection unit 15, a drive current control unit 16, and a notification unit 17. Sensor signal generation circuit 12 amplifies output signals S1 to S3 of magnetic sensors MS1 to MS3 and supplies them to abnormality detection unit 14, lock detection unit 15, and drive current control unit 16.

Reset circuit 13 outputs a reset signal RE only for a predetermined time to reset abnormality detection unit 14 and lock detection unit 15 in each of a case where DC voltage VDC is supplied and a case where a rotational speed indicated by a rotational speed command value RC is set at 0.

Abnormality detection unit 14 determines whether or not the combination of the logic levels of sensor signals S1 to S3 is normal, whenever the combination of the logic levels of sensor signals S1 to S3 is changed. Abnormality detection unit 14 outputs an abnormality detection signal FDa (second abnormality detection signal) during a period in which the combination of the logic levels of sensor signals S1 to S3 is not normal, such as a period in which sensor signals S1 to S3 are all at the "L" level.

Further, abnormality detection unit 14 counts the number of edges in each of sensor signals S1 to S3 (the number of level changes) in response to the occurrence of the abnormality in the combination of the logic levels of sensor signals S1 to S3, and outputs an abnormality detection signal FDb (first abnormality detection signal) when the count value of the edges of one of sensor signals S1 to S3 reaches a threshold value Cth. In response to reset signal RE, abnormality detection unit 14 stops outputting abnormality detection signals FDa, FDb.

When the rotational speed of rotor 1 is decreased to fall below the predetermined rotational speed indicated by rotational speed command value RC and there is no edge in sensor signals S1 to S3 during a lock detection time TL, lock detection unit 15 determines that the rotation of rotor 1 is locked and outputs a lock detection signal LD.

For example, when the number of pole pairs P is 2 in the motor, there are 12 edges in sensor signals S1 to S3 during one rotation of rotor 1. Assuming that lock detection time TL is 1 second, it is determined that the rotation of rotor 1 is locked when the rotational speed of rotor 1 is decreased to be not more than 5 (rpm) and there is no edge in sensor signals S1 to S3 during TL=1 second or less. Assuming that Rt represents the rotational speed of rotor 1 when it is determined that the rotation of rotor 1 is locked, the following expression is established: Rt=60/(6×P×TL). In response to reset signal RE, lock detection unit 15 stops outputting lock detection signal LD.

Drive current control unit 16 operates in synchronization with sensor signals S1 to S3 to generate PWM signals $\phi 1$ to $\phi 6$ to rotate rotor 1 at the rotational speed indicated by rotational speed command value RC. Drive current control unit 16 stops outputting PWM signals $\phi 1$ to $\phi 6$ in response to each of abnormality detection signal FDa, abnormality detection signal FDb, and lock detection signal LD. Transistors Q1 to Q6, resistive elements R1 to R6, driver 11, and drive current control unit 16 are included in a drive circuit.

In response to each of abnormality detection signal FDa, abnormality detection signal FDb, and lock detection signal LD, notification unit 17 outputs an alarm signal AL in order to notify failure of three-phase brushless motor 10. A buzzer, a lamp, or the like may be further provided to notify the occurrence of the failure to a user of motor 10 by way of sound, light, or the like in response to alarm signal AL.

Figure 3:
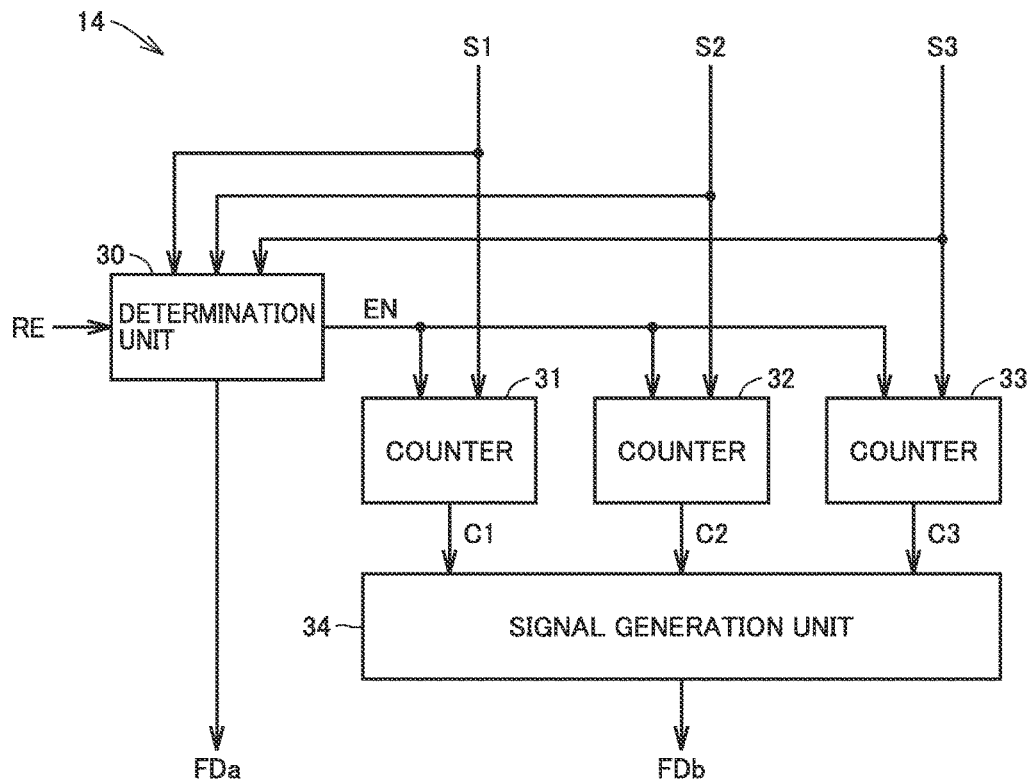
FIG. 3 is a block diagram showing a configuration of an abnormality detection unit shown in FIG. 2.

FIG. 3 is a block diagram showing a configuration of abnormality detection unit 14. In FIG. 3, abnormality detection unit 14 includes a determination unit 30, counters 31 to 33, and a signal generation unit 34. Determination unit 30 is reset by reset signal RE, and determines whether or not the combination of the logic levels of sensor signals S1 to S3 is normal, whenever the combination of the logic levels of sensor signals S1 to S3 is changed.

The logic levels of sensor signals S1 to S3 do not become the same when magnetic sensors MS1 to MS3 are normal, because sensor magnet 5 is divided into four in the rotation direction such that the S and N poles are alternately arranged and three magnetic sensors MS1 to MS3 are arranged at an interval of 120° so as to face the outer circumferential surface of sensor magnet 5 as shown in FIG. 1.

Determination unit 30 outputs abnormality detection signal FDa during a period in which the combination of the logic levels of sensor signals S1 to S3 is not normal (for example, a period in which the logic levels of signals S1 to S3 are the same).

Further, in response to occurrence of the abnormality in the combination of the logic levels of sensor signals S1 to S3 (for example, in response to the logic levels of signals S1 to S3 being the same), determination unit 30 outputs an activation signal EN. Determination unit 30 stops outputting abnormality detection signal FDa and activation signal EN in response to reset signal RE.

Counters 31 to 33 are activated during a period in which activation signal EN is output from determination unit 30, count the respective numbers of the level changes of sensor signals S1 to S3, and output count values C1 to C3 to signal generation unit 34. When the output of activation signal EN from determination unit 30 is stopped, count values C1 to C3 of counters 31 to 33 are reset to 0.

When any one of count values C1 to C3 of counters 31 to 33 reaches threshold value Cth and any one of count values C1 to C3 is 0, signal generation unit 34 outputs abnormality detection signal FDb.

Figure 4:
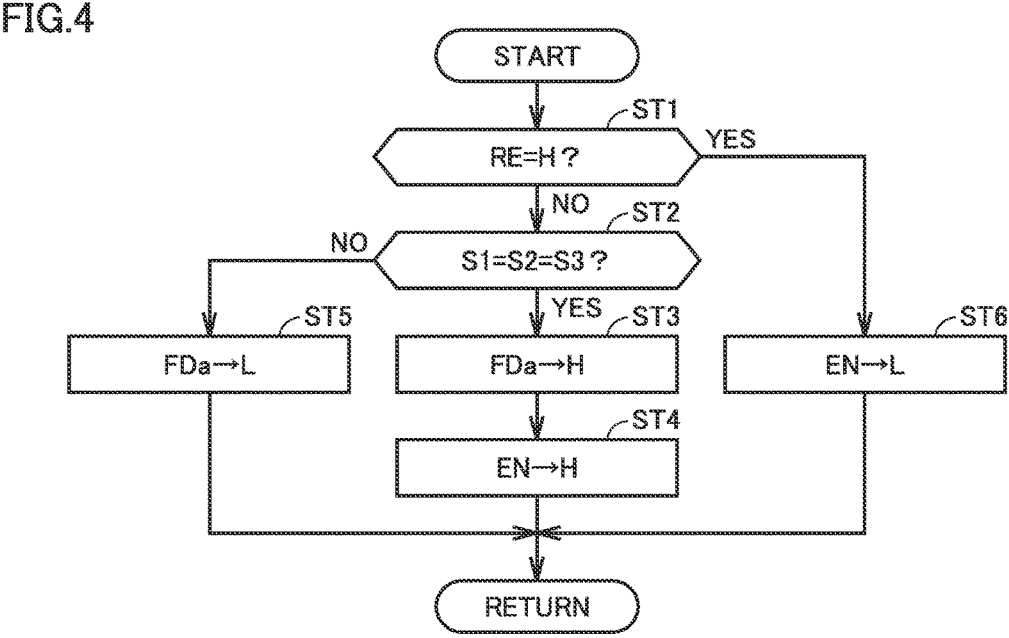
FIG. 4 is a flowchart showing an operation of a determination unit shown in FIG. 3.

FIG. 4 is a flowchart showing an operation of determination unit 30 shown in FIG. 3. In FIG. 4, in a step ST1, determination unit 30 determines whether or not reset signal RE is at the "H" level (i.e., whether or not reset signal RE is output). When it is determined in step ST1 that reset signal RE is at the "L" level (i.e., reset signal RE is not output), determination unit 30 determines in a step ST2 whether or not sensor signals S1 to S3 are the same (i.e., whether or not S1=S2=S3).

When it is determined in step ST2 that sensor signals S1 to S3 are the same (i.e., sensor signals S1 to S3 are abnormal), determination unit 30 sets abnormality detection signal FDa at the "H" level (i.e., outputs abnormality detection signal FDa) in a step ST3, sets activation signal EN at the "H" level (i.e., outputs activation signal EN) in a step ST4, and then returns to step ST1.

When such a condition is not established that sensor signals S1 to S3 are the same in step ST2, determination unit 30 sets abnormality detection signal FDa at the "L" level (i.e., stops the output of abnormality detection signal FDa) in a step ST5 and then returns to step ST1.

When it is determined in step ST1 that reset signal RE is at the "H" level (i.e., reset signal RE is output), determination unit 30 sets activation signal EN at the "L" level in a step ST6 (i.e., stops outputting activation signal EN), and then returns to step ST1.

Figure 5:
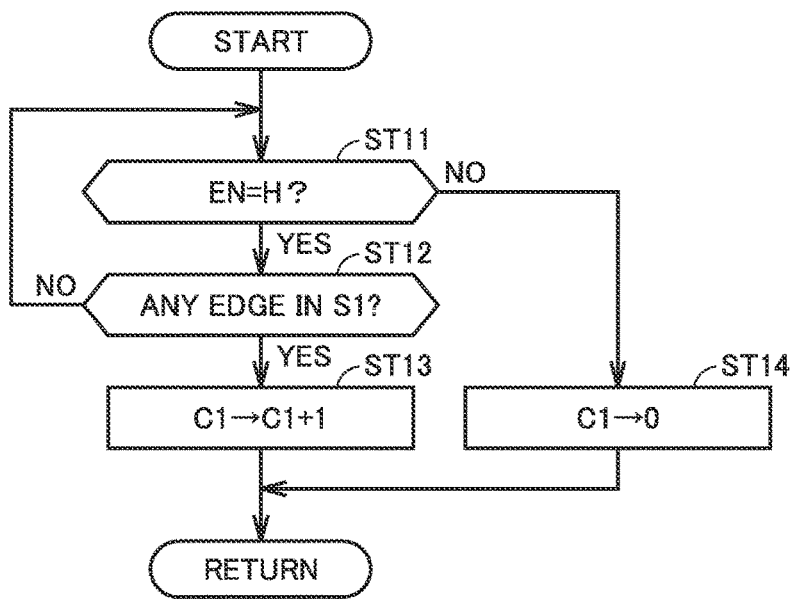
FIG. 5 is a flowchart showing an operation of a counter shown in FIG. 3.

FIG. 5 is a flowchart showing an operation of counter 31 shown in FIG. 3. In FIG. 5, in a step ST11, counter 31 determines whether or not activation signal EN is at the "H" level (i.e., whether or not activation signal EN is output). When it is determined in step ST11 that activation signal EN is at the "H" level (i.e., activation signal EN is output), counter 31 determines in a step ST12 whether or not there is an edge (level change) in sensor signal S1.

When it is determined in step ST12 that there is no edge in sensor signal S1, counter 31 returns to step ST11. When it is determined in step ST12 that there is an edge in sensor signal S1, counter 31 increments count value C1 (by +1) in a step ST13, and then returns to step ST11.

When it is determined in step ST11 that activation signal EN is not at the "H" level (i.e., activation signal EN is not output), counter 31 resets count value C1 to 0 in a step ST14, and returns to step ST11. Operations of counters 32, 33 are the same as the operation of counter 31 and are therefore not repeatedly described.

Figure 6:
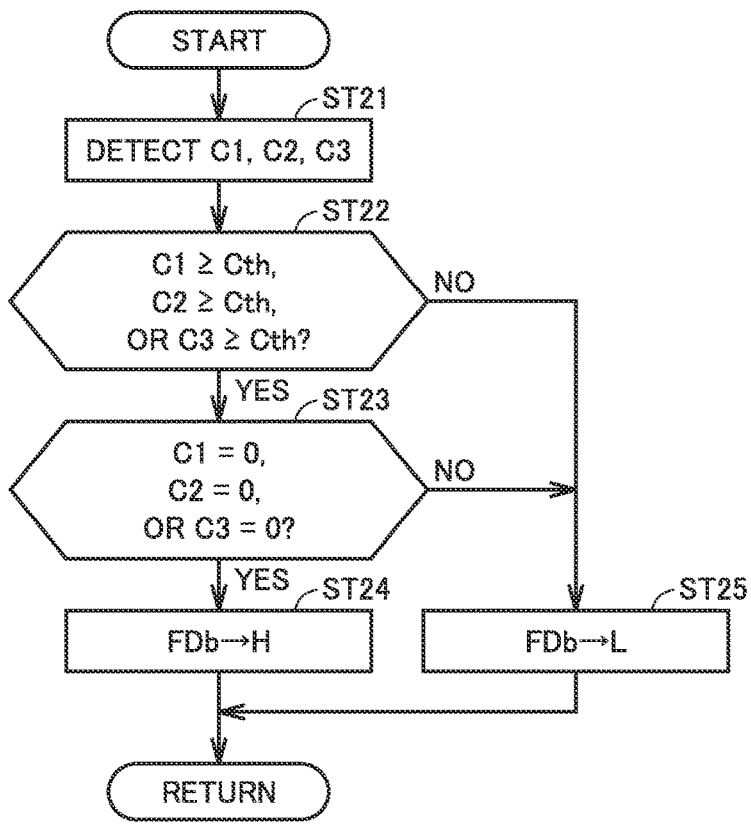
FIG. 6 is a flowchart showing an operation of a signal generation unit shown in FIG. 3.

FIG. 6 is a flowchart showing an operation of signal generation unit 34 shown in FIG. 3. In FIG. 6, signal generation unit 34 detects count values C1 to C3 of counters 31 to 33 in a step ST21, and determines in a step ST22 whether C1≥Cth, C2≥Cth, or C3≥Cth (i.e., whether or not one of count values C1 to C3 reaches threshold value Cth).

When it is determined in step ST22 that C1≥Cth, C2≥Cth, or C3≥Cth, signal generation unit 34 determines in a step ST23 whether C1=0, C2=0, or C3=0 (i.e., whether or not one of count values C1 to C3 is 0).

When it is determined in step ST23 that C1=0, C2=0, or C3=0, signal generation unit 34 sets abnormality detection signal FDb at the "H" level (i.e., outputs abnormality detection signal FDb) in a step ST24, and returns to step ST21.

When C1≥Cth, C2≥Cth, or C3≥Cth is not satisfied in step ST22, signal generation unit 34 sets abnormality detection signal FDb at the "L" level in a step ST25, and returns to step ST21. When C1=0, C2=0, or C3=0 is not satisfied in step ST23, signal generation unit 34 sets abnormality detection signal FDb at the "L" level in step ST25, and returns to step ST21. It should be noted that C1=0, C2=0, or C3=0 is not satisfied in step ST23 when sensor signals S1 to S3 become normal again just after they become abnormal.

Figure 7:
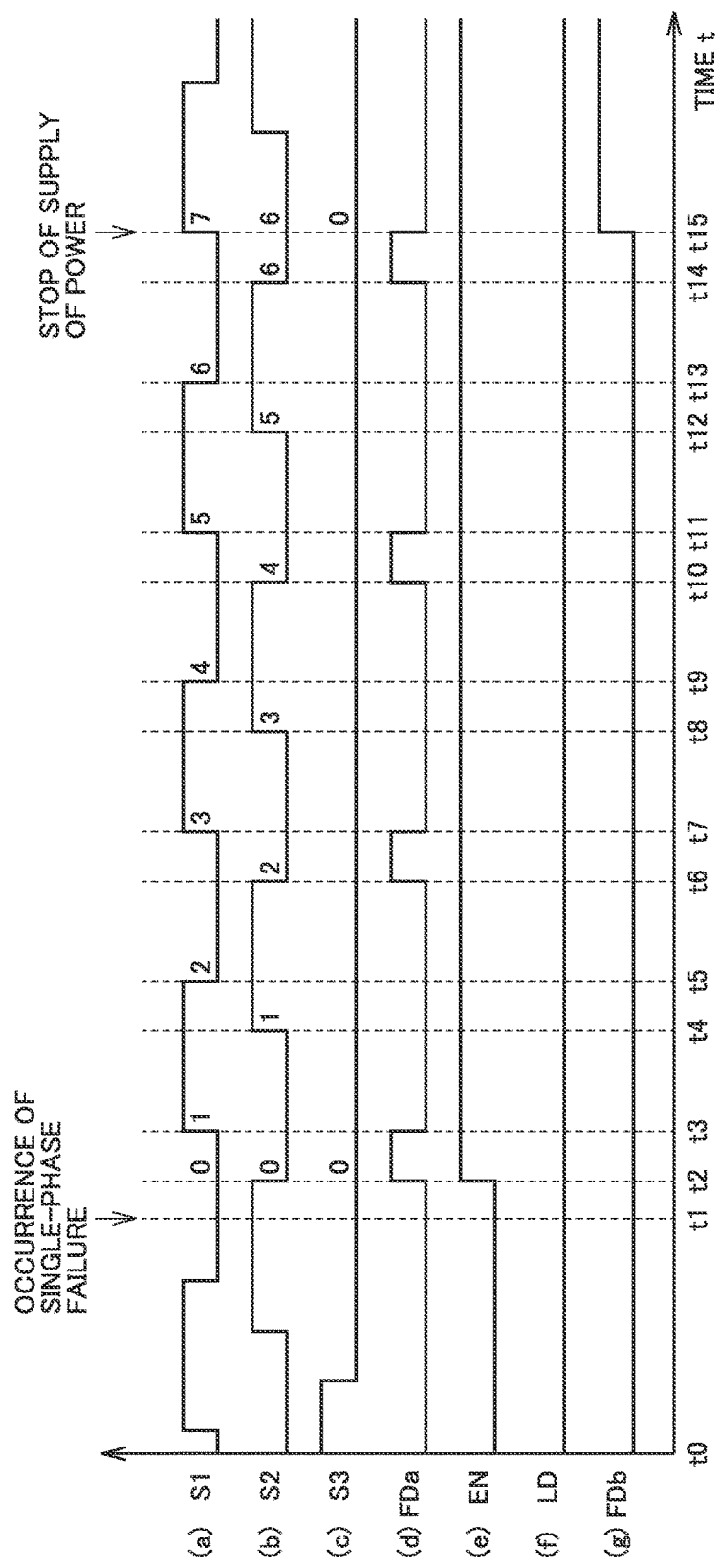
FIG. 7 is a time chart showing an operation of the motor drive device shown in FIG. 2 to FIG. 6.

FIG. 7 is a time chart showing an operation of motor drive device 20 upon occurrence of a single-phase failure. FIG. 7 shows (a) to (g), which represent respective waveforms of sensor signal S1, sensor signal S2, sensor signal S3, abnormality detection signal FDa, activation signal EN, lock detection signal LD, and abnormality detection signal FDb.

The single-phase failure refers to occurrence of abnormality in only one of three sensor signals S1 to S3. When such a single-phase failure occurs, three-phase brushless motor 10 is operated with the two phases, thus continuing the rotation of rotor 1. Accordingly, supply of power to motor 10 cannot be stopped by lock detection unit 15, with the result that overcurrent may flow to damage transistors Q1 to Q6. In the present embodiment, when the single-phase failure occurs, supply of power to motor 10 is stopped by abnormality detection unit 14.

In an initial state (time t0), sensor signals S1 to S3 are normal, and abnormality detection signal FDa, activation signal EN, lock detection signal LD, and abnormality detection signal FDb are at the non-activation level, "L" level. It should be noted that reset signal RE is at the non-activation level, "L" level.

At a time t1, it is assumed that only magnetic sensor MS3 of the magnetic sensors MS1 to MS3 is failed and sensor signal S3 is unchanged from the "L" level. Since sensor signals S1, S2 are normal, three-phase brushless motor 10 is operated with the two phases in synchronization with sensor signals S1, S2.

When sensor signal S2 falls from the "H" level to the "L" level at a time t2, sensor signals S1 to S3 all become 0 ("L" level), with the result that determination unit 30 of FIG. 3 rises abnormality detection signal FDa and activation signal EN from the non-activation level, "L" level, to the activation level, "H" level (steps ST1 to ST4 in FIG. 4).

When abnormality detection signal FDa rises to the "H" level, transistors Q1 to Q6 are fixed to the OFF state by drive current control unit 16, thereby stopping supply of power to armature coils 4a to 4f. When activation signal EN rises to the "H" level, counters 31 to 33 of FIG. 3 are activated.

When sensor signal S1 rises from the "L" level to the "H" level at a time t3, abnormality detection signal FDa falls to the non-activation level, "L" level (steps ST1, ST2, ST5 in FIG. 4), and count value C1 of counter 31 is incremented to satisfy C1=1 (steps ST11 to ST13 in FIG. 5). When abnormality detection signal FDa falls to the "L" level, drive current control unit 16 starts to turn on/off transistors Q corresponding to sensor signals S1, S2 to start supply of power to armature coils 4a to 4f, thereby operating three-phase brushless motor 10 with the two phases.

When sensor signal S2 rises from the "L" level to the "H" level at a time t4, count value C2 of counter 32 is incremented to satisfy C2=1. When sensor signal S1 falls from the "H" level to the "L" level at a time t5, count value C1 of counter 31 is incremented to satisfy C1=2 (steps ST11 to ST13 in FIG. 5).

When sensor signal S2 falls from the "H" level to the "L" level at a time t6, sensor signals S1 to S3 all become 0 ("L" level), with the result that determination unit 30 of FIG. 3 rises abnormality detection signal FDa from the non-activation level, "L" level, to the activation level, "H" level (steps ST1 to ST4 in FIG. 4), and count value C2 of counter 32 is incremented to satisfy C2=2.

Thereafter, in a similar manner, count value C1 of counter 31 is incremented whenever the logic level of sensor signal S1 is changed, count value C2 of counter 32 is incremented whenever the logic level of sensor signal S2 is changed, and abnormality detection signal FDa is set at the "H" level whenever sensor signals S1 to S3 are all at the "L" level.

When sensor signal S1 rises from the "L" level to the "H" level at a time t15, count value C1 of counter 31 reaches threshold value Cth=7. On this occasion, count value C3 of counter 33 is 0, so that signal generation unit 34 of FIG. 3 rises abnormality detection signal FDb from the non-activation level, "L" level, to the "H" level (steps ST21 to ST24 in FIG. 6).

When abnormality detection signal FDb is set at the "H" level, drive current control unit 16 fixes transistors Q1 to Q6 to the OFF state, thereby stopping supply of power to armature coils 4a to 4f to stop the rotation of rotor 1. Accordingly, transistors Q1 to Q6 can be prevented from being damaged due to overcurrent otherwise flowing in transistors Q1 to Q6.

Moreover, when abnormality detection signal FDb is set at the "H" level, notification unit 17 of FIG. 2 sets alarm signal AL at the "H" level (i.e., outputs alarm signal AL) to notify occurrence of failure to the user of motor 10. In response to alarm signal AL, the user of motor 10 interrupts DC voltage VDC and repairs three-phase brushless motor 10, for example. When DC voltage VDC is supplied after the repair, reset circuit 13 of FIG. 13 sets reset signal RE at the activation level, "H" level, for a certain period in order to reset abnormality detection unit 14 (steps ST1, ST6 in FIG. 4 and steps ST11, ST14 in FIG. 5).

Figure 8:
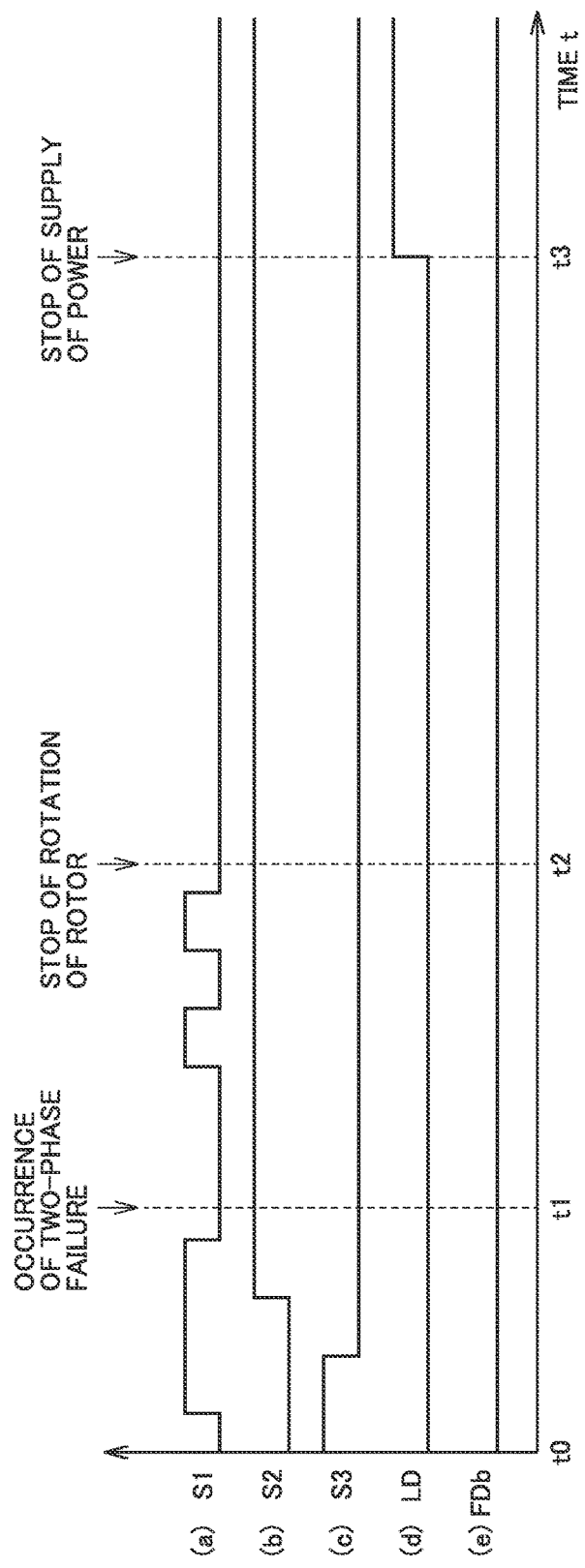
FIG. 8 is a time chart showing another operation of the motor drive device shown in FIG. 2 to FIG. 6.

FIG. 8 is a time chart showing an operation of motor drive device 20 upon occurrence of a two-phase failure. FIG. 8 shows (a) to (e), which represent respective waveforms of sensor signal S1, sensor signal S2, sensor signal S3, lock detection signal LD, and abnormality detection signal FDb. The two-phase failure refers to occurrence of abnormality in only two of three sensor signals S1 to S3. When such a two-phase failure occurs, the rotation of rotor 1 is stopped, and supply of power to motor 10 is stopped by lock detection unit 15.

In an initial state (time t0), sensor signals S1 to S3 are normal, and lock detection signal LD and abnormality detection signal FDb are at the non-activation level, "L" level. At a time t1, it is assumed that only magnetic sensors MS2, MS3 of magnetic sensors MS1 to MS3 are failed, and sensor signals S2, S3 are unchanged from the "H" level and the "L" level respectively. When the two-phase failure occurs, each of transistors Q1 to Q6 is fixed to its state (ON or OFF state) upon the occurrence of the failure. It is illustrated that during a period of time from t1 to t2, magnetic sensor MS1 is located near a boundary between the N and S poles of sensor magnet 5 to result in fluctuation in the level of sensor signal S1.

At time t2, rotor 1 is stopped completely. At a time t3 after passage of certain time since the rotational speed of rotor 1 has been decreased to fall below a predetermined value, lock detection unit 15 rises lock detection signal LD from the non-activation level, "L" level, to the activation level, "H" level (i.e., outputs lock detection signal LD).

When lock detection signal LD is set at the "H" level, drive current control unit 16 fixes transistors Q1 to Q6 to the OFF state to stop supply of power to armature coils 4a to 4f, and notification unit 17 sets alarm signal AL at the activation level, "H" level (i.e., outputs alarm signal AL). Accordingly, transistors Q1 to Q6 are prevented from being damaged and the occurrence of the failure is notified to the user of motor 10.

Figure 9:
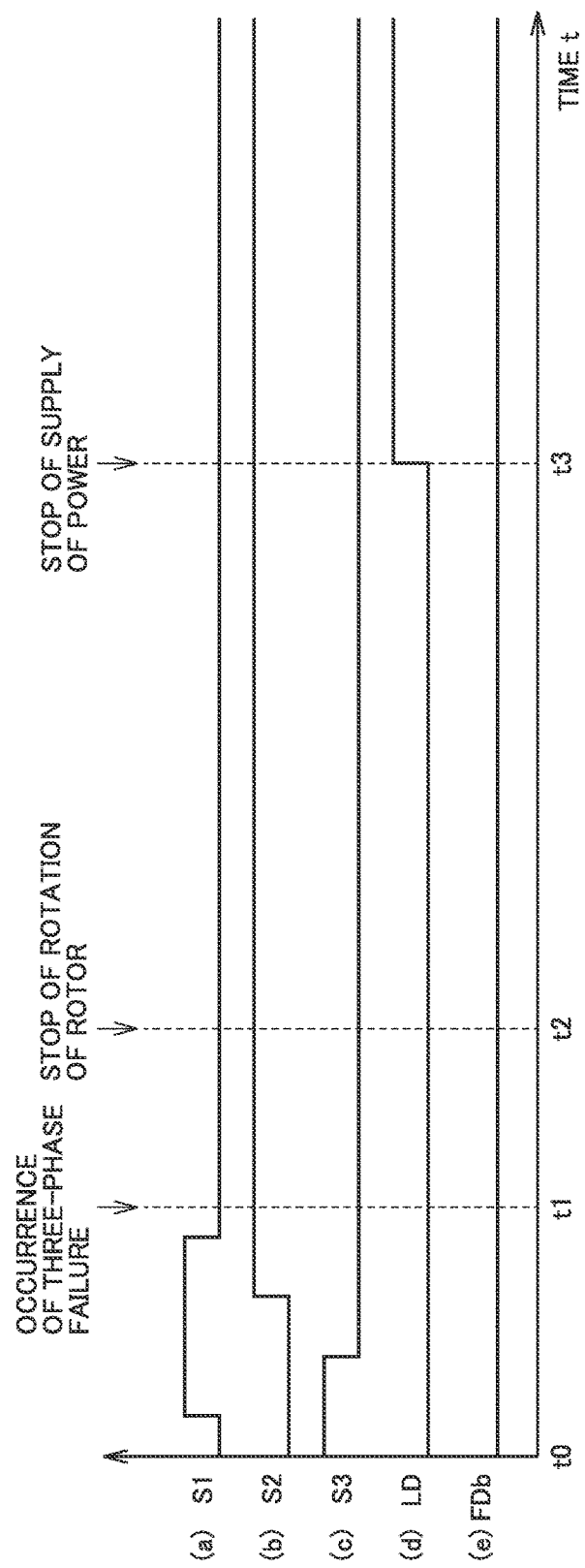
FIG. 9 is a time chart showing a still another operation of the motor drive device shown in FIG. 2 to FIG. 6.

FIG. 9 is a time chart showing an operation of motor drive device 20 upon occurrence of a three-phase failure. FIG. 9 shows (a) to (e), which represent respective waveforms of sensor signal S1, sensor signal S2, sensor signal S3, lock detection signal LD, and abnormality detection signal FDb. The three-phase failure refers to occurrence of abnormality in all of three sensor signals S1 to S3. When such a three-phase failure occurs, the rotation of rotor 1 is stopped, and supply of power to motor 10 is stopped by lock detection unit 15.

In an initial state (time t0), sensor signals S1 to S3 are normal, and lock detection signal LD and abnormality detection signal FDb are at the non-activation level, "L" level. At a time t1, it is assumed that all of magnetic sensors MS1 to MS3 are failed and sensor signals S1, S2, S3 are respectively unchanged from the "L" level, the "H" level, and the "L" level. When the three-phase failure occurs, each of transistors Q1 to Q6 is fixed to its state (ON or OFF state) upon the occurrence of the failure.

At a time t2, rotor 1 is stopped completely. At a time t3 after passage of certain time since the rotational speed of rotor 1 has become 0, lock detection unit 15 rises lock detection signal LD from the non-activation level, "L" level, to the activation level, "H" level (i.e., outputs lock detection signal LD).

When lock detection signal LD is set at the "H" level, drive current control unit 16 fixes transistors Q1 to Q6 to the OFF state to stop supply of power to armature coils 4a to 4f, and notification unit 17 sets alarm signal AL at the activation level, "H" level (i.e., outputs alarm signal AL). Accordingly, transistors Q1 to Q6 are prevented from being damaged and the occurrence of the failure is notified to the user of motor 10.

FIG. 10 is a time chart showing an operation of motor drive device 20 when the rotation of rotor 1 is locked, magnetic sensor MS2 is located near the boundary between the N and S poles of sensor magnet 5, and the logic level of sensor signal S2 is fluctuated. FIG. 10 shows (a) to (e), which represent respective waveforms of sensor signal S1, sensor signal S2, sensor signal S3, abnormality detection signal FDa, activation signal EN, lock detection signal LD, and abnormality detection signal FDb.

When a load (such as a fan for sending air) of motor 10 is failed and the rotation of rotor 1 is locked accordingly, time measuring means in lock detection unit 15 measures a time elapsed since changes in the logic levels of sensor signals S1 to S3 have been stopped. When the elapsed time reaches a predetermined time, lock detection signal LD is output to stop supply of power to motor 10.

However, magnetic sensor MS may be located near the boundary between the N and S poles of sensor magnet 5, and the logic level of sensor signal S2 may be fluctuated according to vibration in the rotation direction of rotor 1. This phenomenon is likely to occur when motor 10 is controlled to rotate rotor 1 at a constant rotational speed. This is due to the following reason. That is, when the rotation of rotor 1 is locked, drive current control unit 16 continues to increase current to be supplied to armature coils 4a to 4f in order to rotate rotor 1, with the result that vibration occurs at a contact point between a foreign object causing the lock and the rotation member of the load. In such a case, lock detection unit 15 cannot measure the elapsed time from the occurrence of lock, and therefore cannot output lock detection signal LD. In the present embodiment, in such a case, supply of power to motor 10 is stopped by abnormality detection unit 14.

In an initial state (time t0), sensor signals S1 to S3 are normal, and abnormality detection signal FDa, activation signal EN, lock detection signal LD, and abnormality detection signal FDb are at the non-activation level, "L" level. At a time t1, it is assumed that the rotation of rotor 1 is locked, magnetic sensor MS2 is located near the boundary between the N and S poles of sensor magnet 5, and the logic level of sensor signal S2 is fluctuated according to vibration in the rotation direction of rotor 1.

At time t1, all of sensor signals S1 to S3 become 0 ("L" level), and determination unit 30 of FIG. 3 rises each of abnormality detection signal FDa and activation signal EN from the non-activation level, "L" level, to the activation level, "H" level.

When sensor signal S2 rises from the "L" level to the "H" level at a time t2, count value C2 of counter 32 is incremented to satisfy C2=1 and abnormality detection signal FDa falls to the "L" level. When sensor signal S2 falls from the "H" level to the "L" level at a time t3, count value C2 of counter 32 is incremented to satisfy C2=2 and abnormality detection signal FDa rises to the "H" level. Thereafter, in a similar manner, whenever the logic level of sensor signal S2 is changed, count value C2 of counter 32 is incremented and the logic level of abnormality detection signal FDa is changed.

When sensor signal S2 rises from the "L" level to the "H" level at a time t8, count value C2 of counter 32 reaches threshold value Cth=7. On this occasion, count values C1, C3 of counters 31, 33 are 0, so that signal generation unit 34 of FIG. 3 rises abnormality detection signal FDb from the non-activation level, "L" level, to the "H" level.

When abnormality detection signal FDb is set at the "H" level, transistors Q1 to Q6 are fixed to the OFF state by drive current control unit 16, thereby stopping supply of power to armature coils 4a to 4f. Accordingly, transistors Q1 to Q6 can be prevented from being damaged due to overcurrent otherwise flowing in transistors Q1 to Q6.

Moreover, when abnormality detection signal FDb is set at the "H" level, notification unit 17 of FIG. 2 sets alarm signal AL at the "H" level (i.e., outputs alarm signal AL) to notify the occurrence of the failure to the user of motor 10.

As described above, in the present embodiment, the number of the level changes in sensor signals S1 to S3 is counted in response to the combination of the logic levels of sensor signals S1 to S3 being abnormal. When the count value of the number of the level changes in one of sensor signals S1 to S3 reaches threshold value Cth, supply of drive current to three-phase brushless motor 10 is stopped. Hence, even when only one of sensor signals S1 to S3 becomes abnormal, transistors Q1 to Q6 can be prevented from being damaged due to overcurrent otherwise flowing in transistors Q1 to Q6.

Further, the supply of drive current to three-phase brushless motor 10 is also stopped when the rotation of rotor 1 is locked and the level of the sensor signal is fluctuated according to vibration in the rotation direction of rotor 1 because magnetic sensor MS is located near the boundary between the N and S poles of sensor magnet 5, whereby transistors Q1 to Q6 can be prevented from being damaged.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A motor drive device for driving a three-phase brushless motor,
the three-phase brushless motor including
a stator including a plurality of armature coils,
a rotor including a plurality of permanent magnets and rotatably supported, and
first to third magnetic sensors arranged in a rotation direction of the rotor, the first to third magnetic sensors being configured to respectively output first to third sensor signals,
each of the first to third sensor signals being alternately changed between first and second logic levels in accordance with rotation of the rotor, the first to third sensor signals having phases shifted from one another by 120°,
the motor drive device comprising:
a determination unit configured to determine whether or not a combination of the logic levels of the first to third sensor signals is normal, whenever the logic levels of the first to third sensor signals are changed;
first to third counters configured to respectively count the number of level changes of the first to third sensor signals in response to determining, by the determination unit, that the combination of the logic levels of the first to third sensor signals is not normal;
a signal generation unit configured to output a first abnormality detection signal when any one of count values of the first to third counters reaches a predetermined threshold value; and
a drive circuit configured to (i) supply drive current to the plurality of armature coils in synchronization with the first to third sensor signals to generate a rotating magnetic field to rotate the rotor, and (ii) stop supplying the drive current in response to the first abnormality detection signal;
wherein the signal generation unit is configured to output the first abnormality detection signal when any one of the count values of the first to third counters reaches the predetermined threshold value and when the count value of at least one of the other two counters is 0.

2. A motor drive device for driving a three-phase brushless motor,
the three-phase brushless motor including
a stator including a plurality of armature coils,
a rotor including a plurality of permanent magnets and rotatably supported, and
first to third magnetic sensors arranged in a rotation direction of the rotor, the first to third magnetic sensors being configured to respectively output first to third sensor signals,
each of the first to third sensor signals being alternately changed between first and second logic levels in accordance with rotation of the rotor, the first to third sensor signals having phases shifted from one another by 120°,
the motor drive device comprising:
a determination unit configured to determine whether or not a combination of the logic levels of the first to third sensor signals is normal, whenever the logic levels of the first to third sensor signals are changed;
first to third counters configured to respectively count the number of level changes of the first to third sensor signals in response to determining, by the determination unit, that the combination of the logic levels of the first to third sensor signals is not normal;
a signal generation unit configured to output a first abnormality detection signal when any one of count values of the first to third counters reaches a predetermined threshold value; and
a drive circuit configured to (i) supply drive current to the plurality of armature coils in synchronization with the first to third sensor signals to generate a rotating magnetic field to rotate the rotor, and (ii) stop supplying the drive current in response to the first abnormality detection signal;
wherein the determination unit is configured to output a second abnormality detection signal during a period in which the combination of the logic levels of the first to third sensor signals is not normal, and
the drive circuit is configured to stop outputting the drive current during a period in which the second abnormality detection signal is output from the determination unit.

3. A motor drive device for driving a three-phase brushless motor,
the three-phase brushless motor including
a stator including a plurality of armature coils,
a rotor including a plurality of permanent magnets and rotatably supported, and first to third magnetic sensors arranged in a rotation direction of the rotor, the first to third magnetic sensors being configured to respectively output first to third sensor signals, each of the first to third sensor signals being alternately changed between first and second logic levels in accordance with rotation of the rotor, the first to third sensor signals having phases shifted from one another by 120°, the motor drive device comprising:

a determination unit configured to determine whether or not a combination of the logic levels of the first to third sensor signals is normal, whenever the logic levels of the first to third sensor signals are changed;

first to third counters configured to respectively count the number of level changes of the first to third sensor signals in response to determining, by the determination unit, that the combination of the logic levels of the first to third sensor signals is not normal;

a signal generation unit configured to output a first abnormality detection signal when any one of count values of the first to third counters reaches a predetermined threshold value; and a drive circuit configured to (i) supply drive current to the plurality of armature coils in synchronization with the first to third sensor signals to generate a rotating magnetic field to rotate the rotor, and (ii) stop supplying the drive current in response to the first abnormality detection signal;

wherein the drive circuit is configured to rotate the rotor at a rotational speed indicated by a rotational speed command value, the motor drive device further comprising a lock detection unit configured to output a lock detection signal when the rotation of the rotor is locked, wherein the drive circuit is configured to stop supplying the drive current in response to the lock detection signal.

\* \* \* \* \*